Patented June 19, 1951

2,557,916

UNITED STATES PATENT OFFICE 2,557,916

PREPARATION OF A CARDIO-ACTIVE GLYCOSIDE

Harry Rosen, Drexel Hill, and Casimir T. Ichniowski, Philadelphia, Pa., assignors to Wyeth Incorporated, Philadelphia, Pa., a corporation of Delaware No Drawing. Application July 31, 1948, Serial No. 41,905

8 Claims. (Cl. 260—210.5)

This invention relates to the preparation of a cardio-active glycoside and particularly relates to the extraction and isolation of the chief active glycoside of digitalis in a substantially pure and crystalline state.

The above-mentioned application teaches the preparation of an active cardio-active glycoside of digitalis, specifically digitoxin ($C_{41}H_{64}O_{13}$), the product being characterized by its uniform pharmacological action with side reactions reduced to a minimum.

In the preparation of digitoxin according to the teachings of said prior application, a lower alcohol or mixture of lower alcohols, and water was used to extract the water-insoluble digitoxin substantially completely from digitalis leaves. Thereafter, the extract was treated to remove tannins, ballast and other inert vegetable extractive materials by the addition of a precipitating agent comprising bivalent metal salts such as the basic salts, acetates, chlorides or carbonates of lead, iron, copper, tin or chromium. After the precipitation of the inert vegetative material, the extract was treated to remove all traces of the precipitating agent by treatment with sodium carbonate and/or hydrogen sulfide one or more times. Subsequently, the extract, free of said tannins and vegetable extractive materials and the precipitant, was extracted with a substantially water-immiscible organic solvent in which the active principles were soluble and the solvent solution was then washed to remove undesirable water-soluble fractions. Finally, the digitoxin was subsequently recovered from the solvent and purified.

While the methods disclosed in the prior application produced substantially pure digitoxin in good yield the procedures are complicated by the fact that in the use of the bivalent metal salts, special precautions must be observed in order to remove substantially all traces of the precipitating agent before proceeding with the separation and purification of the digitoxin.

The methods herein disclosed are improvements over the methods disclosed in the above identified application and in accordance with the procedures disclosed herein, 95-100% pure digitoxin may be recovered in substantial yields and in fewer steps.

One object of the present invention is to provide physicians with substantially pure, crystalline digitoxin, the chief cardio-active glycoside of digitalis.

Another object of the invention is to extract digitoxin more completely from crude sources, such as the leaves of *Digitalis purpurea*.

Another object of the invention is to isolate in a substantially pure, crystalline form the digitoxin contained in extract of digitalis.

Other objects will become apparent hereafter in the specification.

We have found that improved yields of substantially pure digitoxin may be obtained in fewer steps by extracting the active principles from the digitalis leaves and, at an early stage of the process, separating out a large portion of undesired inert matter by operating on the extract with a solvent in which substantial amounts of said undesired material is soluble.

Briefly described, the invention involves first extracting digitalis leaves either alone or admixed with a tannin- and extractive-precipitant with an alcoholic solvent. The tannin- and extractive-precipitant prevents a large part of the undesired materials such as tannins, resins, etc., from interfering with the extraction of the active principles by precipitating them in part and in part rendering a portion of the undesired material less soluble in the extract. The extract which contains fatty material, resins, vegetable waxes, ballast and other inert vegetable materials, as well as the active principles, is treated with a resin, wax and fat-soluble and water-immiscible organic solvent in which such materials as well as ballast and inert vegetable materials are soluble leaving the active principles in an aqueous alcoholic extract in a relatively clean condition, substantially freed of inert matter. The active principles are now separated from the aqueous extract by treatment with a substantially water-immiscible organic solvent in which the active principles at this stage are selectively soluble. Water-soluble impurities are removed from the active principles and thereafter purification of the active principles can be carried out in the absence of a substantial amount of inert and undesired material.

Describing the improved procedures in greater detail, one method involves extracting digitalis leaves either by straight or fractional percolation with a menstruum, comprising a lower alcohol or mixture of lower alcohols and water which extracts the water-insoluble digitoxin substantially completely from digitalis leaves. By lower alcohol, we mean the $C_1$-$C_4$ alcohols, particularly methyl, ethyl or isopropyl alcohol. There may be used either singly or in admixture. The alcoholic concentration suitable for use ranges from 50% lower alcohol or alcohols, the remainder being water, to about 95% alcohol or alcohols, although it is preferred that the menstruum comprise a major amount of lower alcohol or alcohols and a minor amount of water. More preferably, denatured ethyl alcohol can be used when the denaturant is present in minor amount and is such that it would not react with the desired digitoxin; and more preferably still, because of relative cost, Standard Denatured Alcohol No. 30, a denatured ethyl alcohol with methyl alcohol as the denaturant, made up in an ethyl to methyl alcohol ratio by volume of about 10:1, can be used. The alcohol is preferably mixed with water on the basis of about 60-70% by volume of alcohol and about 30-40% water for best extraction of active principles.

The extract may now be concentrated to the point where it is largely aqueous and then is washed a number of times with a resin, wax and fat-soluble, water-immiscible organic solvent until the last wash is substantially colorless. Thus, the aqueous extract is now freed of the greater amount of the tannins, ballast and generally inert vegetative materials.

The fat-soluble, water-immiscible organic solvent which removes the undesired material must be a solvent which dissolves resins, waxy and fatty bodies, pigments and other undesired inert vegetative materials and which is further characterized by being water-immiscible and a solvent in which the active principles are insoluble. As examples of suitable water-immiscible, fat and pigment solvents for this purpose may be mentioned representative solvents such as carbon tetrachloride, turpentine, amyl ether, deodorized kerosene, cyclohexane, or, in fact, any solvent capable of dissolving the undesired substances without dissolving the active principles. As a preference, carbon tetrachloride has been found especially suitable for this process.

After the removal of inert vegetable materials, the aqueous extract is treated with a substantially water-immiscible organic solvent in which the active principles are soluble. While the preferred solvent is diethyl ether, other solvents or mixtures of solvents which are substantially water-immiscible may be used, such as isopropyl ether, dimethyl carbonate, n-propyl chloride, methyl chloroform, mixed solvents such as chloroform with amyl ether and the like that dissolve the active principles while dissolving slightly, if any, inert vegetable extractive materials.

The organic solvent extract is now washed a number of times with water or an aqueous alkaline solution until the washes are substantially colorless in order to remove gitalin, if present, and water-soluble vegetable extractive materials in general. When using aqueous alkaline solutions, alkali metal hydroxides or carbonates, preferably sodium carbonate is used. An aqueous solution of about 1-13% alkaline material is preferred.

In various steps of removing the undesired inert vegetative material from the original extract, emulsion formation may sometimes take place if proper care is not taken to avoid this problem. The separate solvents should be so added as to avoid emulsification and the mixtures should not be agitated too violently.

The purified solution of active principles in the water-immiscible organic solvent is dried, filtered and concentrated to remove a substantial amount of solvent. Precipitation of crude digitoxin takes place following the concentration step. The purification of the precipitate is the final step.

The purification of crude digitoxin is carried out by dissolving the precipitate in about 95% alcohol at a temperature of about 60-65° C. and diluting the solution with water at a temperature of about 60-65° C. to an alcohol concentration of about 40%. The solution is permitted to cool and purified digitoxin precipitates therefrom. The product is then filtered off and dried. Additional purifications may be carried out if desired, if a highly purified product is desired.

A second and more preferred method for obtaining pure cardio-active principles is a modification of the above-mentioned method.

This second method involves extracting the digitalis leaves in the presence of a tannin- and extractive-precipitant using bivalent metals such as lead, iron, copper, tin and chromium in the form of their acetates, chlorides or carbonates or their basic salts. These compounds may be used either in solid form as aqueous suspensions or in solution, at a concentration, preferably, of about 25% by weight per unit volume. Among the compounds mentioned, we have found ferrous and lead acetate to be particularly suitable with the latter more particularly preferred.

The extraction of the mixture of digitalis leaves and bivalent metal salts is carried out in the same manner as indicated in the first method, either straight or fractional percolation being used, with the latter being preferred.

The aqueous alcoholic extract may then be distilled with as good vacuum and as little heat as possible to produce a substantially aqueous solution. The distillation is carried out for removal of alcohol to a point generally where uncontrollable frothing prevents further concentration and thereafter the percolate is permitted to cool to about room temperature.

The cooled substantially aqueous percolate is now washed with a resin, wax and fat-soluble, water-immiscible organic solvent, in which the active principles are insoluble, as in the first method, until the last wash is practically colorless. In each wash, the solvent layer is withdrawn and discarded and the aqueous layer containing the active principles is retained.

The washed, substantially aqueous solution is now extracted with a water-immiscible organic solvent in which the active principles are soluble and as indicated in the first method, diethyl ether is preferred although other solvents as indicated above are also practical. Sufficient solvent must be used to extract all the active principles and keep them in solution. Following the extraction, the solvent solution is now washed with water or aqueous alkaline solution until the wash liquid is substantially colorless, the solvent solution is then dried, preferably with an anhydrous salt such as anhydrous sodium sulphate, filtered and distilled to remove a substantial amount of solvent but not so much as to cause immediate precipitation of undesirable solids. The residual liquor is now cooled to the point where precipitation of crude digitoxin takes place.

The crude product obtained by filtration, is purified as indicated hereinbefore and may be recrystallized by successive purifications as desired.

To promote a better understanding of our invention, typical methods of practicing the invention are set forth in the following examples, which are not to be considered limitative but are disclosed for illustrative purposes only.

*Example I*

*Digitalis purpurea* leaves (4 kilograms) were percolated to exhaustion with Standard Denatured Alcohol No. 30 in a 60% aqueous concentration, yielding about 4000 cc. of extract. This was concentrated by distillation to about 2600 cc.

Following the concentration, the concentrate was then treated with six carbon tetrachloride washes of 2080 cc. each. The aqueous extract remaining after the washes totaled 2225 cc.

The washed percolate was then extracted with five treatments of diethyl ether, extractions being made of 1600 cc. portions of ether for each extraction. This extraction step brought the active principles into the solvent.

The ether extract was washed with ten washes of aqueous sodium carbonate solution, using 2000 cc. of about 1% sodium carbonate solution for each wash, the last wash being practically colorless. The final volume of the ether solution was about 6½ liters.

The washed ether solution was dried with anhydrous sodium sulfate, filtered and concentrated in a still to a volume of about 150 cc. This was cooled to room temperature and crude digitoxin precipitated out. The precipitate was isolated by filtration.

The precipitate was dissolved in 26.5 cc. of 95% U. S. P. ethyl alcohol and 36.5 cc. of water at 60° C. The solution was permitted to cool slowly and allowed to stand overnight. A crystalline precipitate of digitoxin was obtained which was isolated by filtration and dried.

Example II

Lead acetate, U. S. P. ($Pb(C_2H_3O_2)_2 \cdot 3H_2O$) in an amount of 15.5 pounds was diluted to 7.5 gallons with distilled water (25% by weight per unit volume). *Digitalis purpurea* leaves (250 pounds) in three batches of 83 lbs., 4.8 oz. each, were each moistened with 2.5 gallons of lead acetate solution in a mixer. The batches were further moistened with 2.5 gallons of 60% Standard Denatured Alcohol No. 30 and the mixture then transferred to a percolator. To the mixture was then added 60% Standard Denatured Alcohol No. 30 until the percolate flowed from the lower orifice and a layer of alcoholic solution remained above the leaves. This was allowed to macerate overnight. After maceration, percolation was started and the first 12 gallons of percolate was collected and labelled A-reserve, which was retained until all the percolate was ready for concentration. The percolation was continued with successive portions of 60% Standard Denatured Alcohol No. 30 collecting three successive portions; A–1, 18 gallons; A–2, 36 gallons; A–3, 36 gallons.

Lead acetate U. S. P. ($Pb(C_2H_3O_2)_2 \cdot 3H_2O$) in an amount of 9 lbs., 4.8 oz. was diluted to 4.5 gallons with distilled water. *Digitalis purpurea* leaves (150 pounds) in two batches of 75 lbs. were each moistened with 2.25 gallons of lead acetate solution in the mixer. These batches were moistened further with 2.25 gallons of percolate A–1 and both mixes were transferred to a percolator. The remainder of percolate A–1 was added and as this disappeared below the surface of leaves percolate A–2 was added. The addition was continued in increasing numerical succession one at a time until the percolate began to flow from the bottom orifice and a stratum of menstruum remained above the leaves. This was also allowed to macerate overnight. Following the maceration, percolation was begun and the first 18 gallons of percolate was collected and labelled B-reserve. This reserved was retained until the percolate was ready for concentration. The percolation was continued with successive portions A–2, A–3 and 60% Standard Denatured Alcohol No. 30 collecting two successive portions: B–1, 30 gallons, and B–2, 30 gallons.

Lead acetate U. S. P. ($Pb(C_2H_3O_2)_2 \cdot 3H_2O$) in an amount of 6 lbs., 3.2 oz. was diluted to 3 gallons with distilled water. *Digitalis purpurea* leaves (100 pounds) in two batches of 50 lbs. each were each moistened with 1.5 gallons of lead acetate solution in a mixer, and then was moistened further with 1.5 gallons of percolate B–1. The mix was transferred to a percolator, the remainder of percolate B–1 was added and as this disappeared below the surface of leaves, B–2 was added and if necessary 60% Standard Denatured Alcohol No. 30, until a stratum of menstruum remained above the leaves. This was allowed to macerate overnight. After maceration, percolation was begun and 30 gallons of percolate was collected and labelled C-reserve. A-reserve of 12 gallons, B-reserve of 18 gallons and C-reserve of 30 gallons were combined to make an approximate total of 60 gallons of reserves. These 60 gallons comprised the complete extract containing the active digitalis principles to be processed for digitoxin.

The 60 gallons of extract were distilled in vacuo at a temperature of about 40° C. The distillation was continued until the combined percolates were concentrated to about 40 gallons, whereupon the concentrate was permitted to cool to room temperature and then transferred to a non-metallic container.

The concentrated extract was washed six times with carbon tetrachloride using each time 80% of the volume of the original concentrated percolate, the carbon tetrachloride layer being withdrawn through the bottom of the tank.

The aqueous layer was now extracted seven times with 24 gallon portions of diethyl ether, the last ether extraction being permitted to stand overnight to insure complete separation. All seven ether extracts were combined and sufficient ether was added to make 140 gallons of ether extract.

Two lots of sodium carbonate solution were prepared by weighing 14 lbs., 10 oz. of sodium carbonate ($Na_2CO_3 \cdot H_2O$) into a tank with sufficient distilled water added to make 1250 lbs. for each lot. The ether extract was washed with 30 gallon portions of sodium carbonate solution until the carbonate solution showed no color when viewed in a filled Erlenmeyer flask, eight to ten carbonate washes being sufficient. After the last carbonate wash, ether loss was made up by adding sufficient diethyl ether to have 140 gallons of ether solution. The washed ether solution was transferred to a drying container to which was added 30 lbs. of anhydrous sodium sulfate. The solution was allowed to dehydrate overnight and was then filtered to completely remove sodium sulfate. The filter cake was washed with dehydrated ether and the ether filtrates were then transferred to a still for distillation.

The distillation of the ether solution was carried out at atmospheric pressure and the solution was concentrated to 5 gallons. The concentrate was then permitted to cool to room temperature and was transferred to glass containers. Precipitation of active principles took place overnight at a temperature of about 70° F. The precipitate was then filtered and washed with a small amount of ether and the solids were air-dried.

The dry precipitate was dissolved in 95% U. S. P. ethyl alcohol at 65° C. using 1 cc. of alcohol for each 30 mg. of precipitate. The alcohol solution was diluted with a sufficient quantity of distilled water at 65° C. to make the resulting alcohol concentration 40%. The alcohol solution was permitted to cool slowly to room temperature (70° F.) and after reaching room temperature a precipitate of digitoxin formed which was then filtered off. This precipitate of crystalline digitoxin was dried in vacuo over calcium chloride.

We claim:
1. In a process for the extraction and isolation of crystalline digitoxin, the steps comprising, extracting digitalis leaves with a mixture comprising a major amount of a lower alcohol and a minor amount of water, in which mixture cardio-active principles are soluble, washing said liquid extract with a fat-soluble, substantially water and active principle-insoluble organic solvent in which vegetative extractive materials are soluble, removing said solvent containing undesired vegetative extractive materials, transferring the active principles from the washed extract into a water-immiscible organic solvent in which the active principles are soluble, separating the solvent solution containing the active principles from the remaining liquid and recovering substantially pure digitoxin from said solvent solution.

2. In a process for the extraction and isolation of crystalline digitoxin, the steps comprising, extracting digitalis leaves together with a tannin- and extractive-precipitant with a mixture comprising a major amount of a lower alcohol and a minor amount of water, in which mixture cardio-active principles are soluble, washing said liquid extract with a fat-soluble, substantially water and active principle-insoluble organic solvent in which vegetative extractive materials are soluble, removing said solvent containing undesired vegetative extractive materials, transferring the active principles from the washed extract into a water-immiscible organic solvent in which the active principles are soluble, separating the solvent solution containing the active principles from the remaining liquid and recovering substantially pure digitoxin from said solvent solution.

3. In a process for the extraction and isolation of crystalline digitoxin, the steps comprising, extracting digitalis leaves with a mixture comprising about 60-70% lower alcohol, the remainder being water, in which mixture cardio-active principles are soluble, washing said liquid extract with a fat-soluble, substantially water and active principle-insoluble organic solvent in which vegetative extractive materials are soluble, removing said solvent containing undesired vegetative extractive materials, transferring the active principles from the washed extract into a water-immiscible organic solvent in which the active principles are soluble, separating the solvent solution containing the active principles from the remaining liquid and recovering substantially pure digitoxin from said solvent solution.

4. In a process for the extraction and isolation of crystalline digitoxin, the steps comprising, extracting digitalis leaves with a mixture comprising a major amount of a lower alcohol and a minor amount of water, in which mixture cardio-active principles are soluble, washing said liquid extract with carbon tetrachloride, removing said carbon tetrachloride containing undesired vegetative extractive materials, transferring the active principles from the washed extract into a water-immiscible organic solvent in which the active principles are soluble, separating the solvent solution containing the active principles from the remaining liquid and recovering substantially pure digitoxin from said solvent solution.

5. In a process for the extraction and isolation of crystalline digitoxin, the steps comprising, extractive digitalis leaves with a mixture comprising a major amount of a lower alcohol and a minor amount of water, in which mixture cardio-active principles are soluble, washing said liquid extract with a fat-soluble, substantially water and active principle-insoluble organic solvent in which vegetative extractive materials are soluble, removing said solvent containing undesired vegetative extractive materials, transferring the active principles from the washed extract into diethyl ether in which the active principles are soluble, separating the diethyl ether solution containing the active principles from the remaining liquid and recovering substantially pure digitoxin from said ether solution.

6. In a process for the extraction and isolation of crystalline digitoxin, the steps comprising, extracting digitalis leaves with a mixture comprising about 60-70% lower alcohol, the remainder being water, in which mixture cardio-active principles are soluble, washing said liquid extract with carbon tetrachloride, removing said carbon tetrachloride containing undesired vegetative extractive materials, transferring the active principles from the washed extract into diethyl ether in which the active principles are soluble, separating the diethyl ether solution containing the active principles from the remaining liquid and recovering substantially pure digitoxin from said ether solution.

7. A process of obtaining digitoxin comprising contacting an aqueous alcoholic extract of *Digitalis purpurea* leaves with a water-immiscible, organic fat solvent in which digitoxin is substantially insoluble, in order to remove oils, resins and undesired material from said aqueous extract, separating the solvent from the extract, contacting the latter with a water-immiscible, organic solvent in which the desired active principles are soluble and thereby solubilizing the active principles into said last-mentioned solvent, washing said last solvent extract with an aqueous medium to remove water-soluble impurities and finally isolating digitoxin from the washed extract.

8. In a process for the extraction and isolation of substantially pure crystalline digitoxin from crude sources, the steps comprising, extracting digitalis leaves admixed with an insolubilizing agent of the group consisting of lead acetate and ferrous acetate with an extracting solution comprising a major amount of a lower alcohol and a minor amount of water, in which solution active principles are soluble, concentrating said extract, treating the resulting concentrated extract with carbon tetrachloride in which undesired substances and fatty materials are soluble, removing said solvent and impurities from the remaining liquid, transferring the active principles in the remaining liquid into diethyl ether solvent which dissolves the desired active principles, washing the last solvent mixture with a dilute, aqueous alkaline medium to remove undesired water-soluble materials, and finally isolating the desired active principles from the washed solvent solution.

HARRY ROSEN.
CASIMIR T. ICHNIOWSKI.

REFERENCES CITED

The following references are of record in the file of this patent:

UNITED STATES PATENTS

| Number | Name | Date |
| --- | --- | --- |
| 2,068,027 | Jager | Jan. 19, 1937 |
| 2,224,804 | Wolf | Dec. 10, 1940 |
| 2,449,673 | Rosen | Sept. 21, 1948 |